United States Patent [19]

Takahashi et al.

[11] 4,034,576
[45] July 12, 1977

[54] CONSTANT VELOCITY UNIVERSAL JOINT

[75] Inventors: Koichi Takahashi, Yokohama; Nobuteru Hitomi, Yokosuka; Taisuke Kizu, Fujisawa, all of Japan

[73] Assignee: Nissan Motor Co., Ltd., Yokohama, Japan

[21] Appl. No.: 645,373

[22] Filed: Dec. 30, 1975

[30] Foreign Application Priority Data

Mar. 18, 1975 Japan .............................. 50-31767

[51] Int. Cl.$^2$ .......................................... F16D 3/30
[52] U.S. Cl. .......................................... 64/21; 64/7
[58] Field of Search .............................. 64/21, 8, 7

[56] References Cited

U.S. PATENT DOCUMENTS

| | | | |
|---|---|---|---|
| 2,911,805 | 11/1959 | Wildhaber | 64/21 |
| 3,133,432 | 5/1964 | Mazziotti | 64/21 |
| 3,176,476 | 4/1965 | Cull | 64/21 |
| 3,664,152 | 5/1972 | Macielinski | 64/21 |
| 3,875,762 | 4/1975 | Tampalini | 64/21 |

*Primary Examiner*—Samuel Scott
*Assistant Examiner*—Randall Heald

[57] ABSTRACT

A constant velocity universal joint comprises an outer member with an axial bore therethrough, a ball retaining cage within the axial bore and having first and second part-spherical outer surface portions which have the centers of curvature offset by an equal amount on opposite sides of the joint center along the joint axis, and inner member within the cage and restraining means having a part-spherical inner surface portion which engages the second part-spherical outer surface portion of the cage to assist in preventing relative movement between the cage and inner member in at least one direction.

21 Claims, 12 Drawing Figures

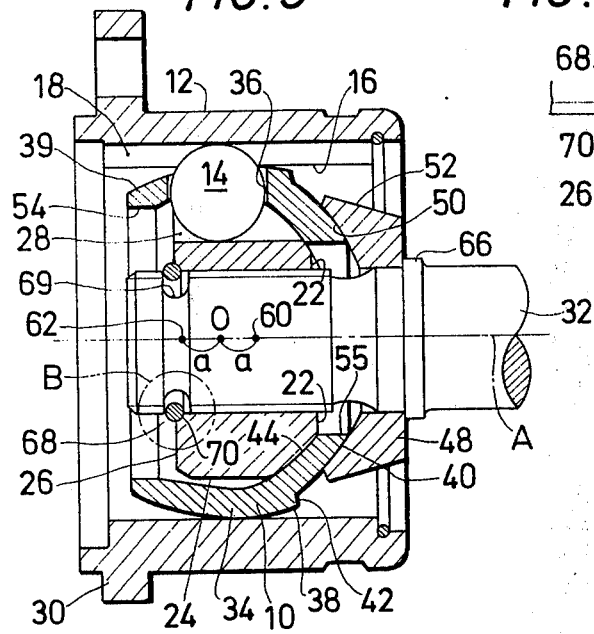
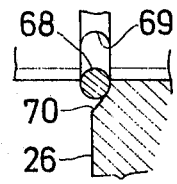
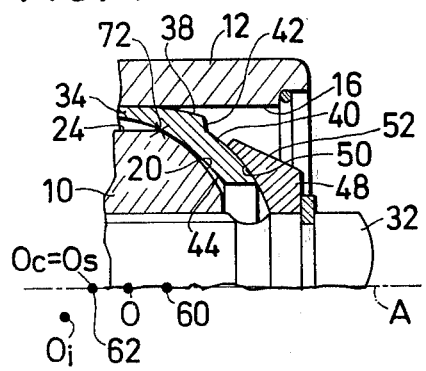
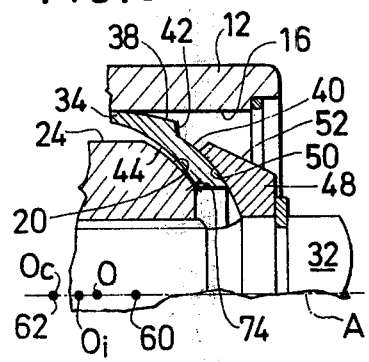
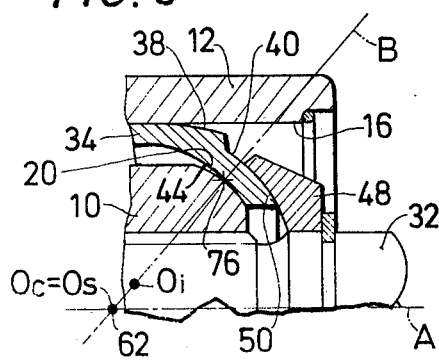
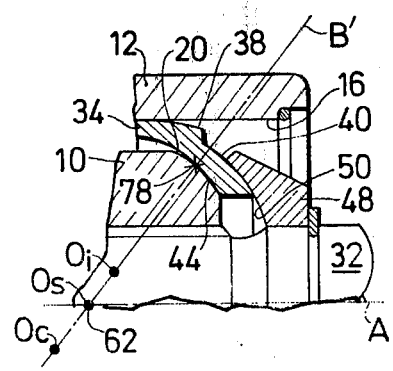

CONSTANT VELOCITY UNIVERSAL JOINT

The present invention relates to a constant velocity universal joint, and more particularly to a constant velocity universal joint including an offset cage.

With constant velocity joints the torque is transmitted by balls, which are arranged between an inner and an outer joint member, in guide grooves thereof. In order to obtain a constant velocity in every angular position of the joint or during the joint articulation, the balls must be guided in such a way, that at each bending angle of the joint, the balls must be arranged in a so-called constant velocity plane, that is, a plane which passes through the instantaneous center of the joint and bisects the instantaneous input and output axes of the joint. Such axes are the rotational axes of the two joint members and the joint center is the point at which these axes intersect; the term "joint axis" as used herein refers to the common input and output axis in the condition of zero joint angle.

For keeping the balls always in the same plane, it is a known practice to keep the balls not only in guide grooves, but also in windows of a cage which is arranged between the two joint members.

In a known form of a constant velocity joint, for positively guiding the balls in a constant velocity plane during bending of the joint, the cage is guided by a part-spherical outer surface in an inner surface of an axial bore of the outer joint member, and by a part-spherical inner surface in a part-spherical outer surface of the inner joint member. When the joint is to function as a sliding joint wherein the joint members can not only move angularly with respect to each other but also be displaced in an axial direction, then the inner surface of the outer joint member is cylindrical. If it is desired to have the universal joint as a fixed joint wherein the joint members move only angularly with respect to each other, then the inner surface of the outer joint member is part-spherical.

For achieving the offset effect which controls attainment of the constant velocity plane, the centers of curvature of the part-spherical outer and inner surfaces of the cage are offset by an equal amount (this amount being herein referred to by the term "offset amount") on opposite sides of the joint center along the joint axis. In this known form of constant velocity joint, the wedge effect of the different thickness of the cage will assume the control of the guiding of the balls into the constant velocity plane. In order to obtain the desired constant velocity characteristics of the joint, a cage with a relatively great offset amount is required.

There are a few possibilities for increasing the offset amount of the cage with the same structural volume of the joint.

The first possibility consists of displacing the center of curvature of part-spherical outer and inner surfaces of the cage away from the joint center along the joint axis with their radii of curvature unchanged. This possibility causes the cage wall to become thin at one end thereof. Thereby, the desired offset amount will not be obtained with a sufficient strength in rigidity of the cage.

The second possibility consists of decreasing the radius of curvature of a part-spherical inner surface of a cage relative to that of a part-spherical outer surface of the cage. Although this possibility prevents the cage wall from becoming thin at one end thereof, the sides of the guide grooves will be subject to a greater stress, however, because the amount of plunging of each of the balls into one of the guide grooves will become less. Thereby, the sides of guide grooves tend to break during a relatively heavy torque transmission by the joint.

As the cage not only centers the inner joint member but is held captive thereon in the axial by its part-spherical inner surface mating with the complementary part-spherical outer surface of the inner member, the part-spherical inner surface of the cage will wear at a higher rate as compared to the part-spherical outer surface of the cage. On account of this disadvantage the constant velocity characteristics of the joint is greatly deteriorated after a long use.

It is a main object of the present invention to provide a constant velocity universal joint which has a better constant velocity characteristics with the same structural volume of the joint.

It is a further object of the present invention to provide a constant velocity universal joint which can maintain its initial constant velocity characteristics for a long time.

It is another object of the present invention to provide a constant velocity universal joint of the above character which is free from noise, vibration and seizure during operation of the joint.

The above and other objects, features and advantages of the present invention will become clear from the following description along with the accompanying drawings, in which:

FIG. 3 is an axial sectional view of a second embodiment of a constant velocity universal joint in accordance with the present invention;

FIG. 3a is an enlarged view of a portion encircled by a circle B in FIG. 3;

FIGS. 4 and 5 are fragmentary sectional views explaining problems encountered in the joints of FIG. 1 or 3;

FIG. 6 is a fragmentary sectional view of a third embodiment of a constant velocity universal joint according to the present invention;

FIG. 7 is a fragmentary sectional view of a fourth embodiment of a constant velocity universal joint according to the present invention;

Figure 1:
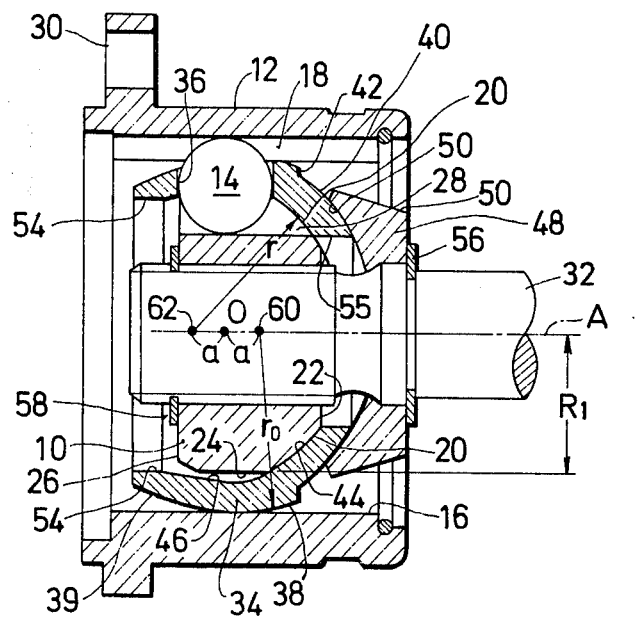
FIG. 1 is an axial sectional view of a first embodiment of a constant velocity universal joint constructed in accordance with the present invention.

Referring first to FIG. 1, the joint illustrated therein comprises an inner member 10 axially movable within a hollow generally cylindrical outer member 12 and coupled therein to a series of equiangularly spaced torque-transmitting balls such as 14. The sectioning of the joint is taken in different radial planes above and below the joint axis A, respectively, whereby to show above that axis the sectional form of the joint components between adjacent balls 14.

The outer member 12 has a cylindrical through bore 16 machined with longitudinally extending grooves 18. The inner member 10 has a curved outer surface portion 20 adjacent one end 22 thereof which merges with a cylindrical outer surface portion 24 adjacent the opposite end 26. The outer surface portion 20 is part-spherical. The outer surface of the inner member 10 consisting of the two outer surface portions 20 and 24 is similarly machined with grooves such as 28. The grooves 18 and 28 in the two members 10 and 12 cooperate in pairs to provide ball tracks along which the balls 14 roll during joint articulation and plunge.

At one end of the outer member 12 it has external peripheral flange 30 and bolting to a driven shaft (not shown). The inner member 10 has a splined connection with a drive shaft 32 which projects from the opposite end of the outer member 12.

A ball cage 34 with window apertures such as 36 in which the balls 14 are closely received is positioned between the members 10 and 12. The cage 34 has a first curved outer surface portion 38 which is part-spherical and which engages the cylindrical bore 16 of the outer member 12. The first outer surface portion 38 merges with a frustoconical portion 39 adjacent one end. The cage 34 also has a second curved outer surface portion 40 adjacent the opposite end which is part-spherical and which merges with the first outer surface portion 38 through an annular shoulder 42. Adjacent the opposite end the cage 34 has a curved inner surface portion 44 which is part-spherical and which mates with the complementary outer surface portion 20 of the inner member 10. The remaining inner surface portion 46 is of frustoconical form which merges with the inner surface portion 44. This allows the cage 34 to be of much stronger construction and thicker at the ends than if the inner surface were completely part-spherical, and the frustoconical surface 46 is arranged so that it will not engage the inner member 10. This construction therefore permits axial movement of the inner member 10 relative to the cage 34. To assist the cage 34 in preventing such relative axial movement between the cage 34 and inner member 10 and to help it center the inner member 10, a restraining member 48 is provided separately from and acts between the cage 34 and inner member 10.

As can be seen from FIG. 1, the restraining member 48 is fitted on the shaft 32 and is in the form of an annulus having a bore 50 with an inwardly facing surface which is part-spherical and which mates with the complementary outer surface 40 of the cage 34 so that the restraining member 48 not only prevents movement of the cage 34 relative to the inner member 10 in a rightward direction as viewed in FIG. 1 but cooperates with the cage 34 to center the inner member 10. Preferably, the external surface 52 of the restraining member 48 is of frustoconical form and is arranged so that it engages the bore 16 of the outer member to provide a positive stop against overangling of the joint (see FIG. 2).

Figure 2:
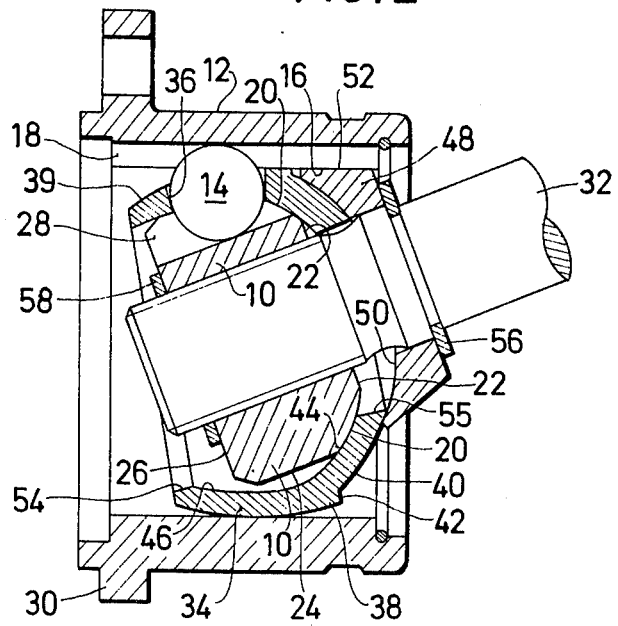
FIG. 2 is an axial sectional view showing the joint of FIG. 1 at the maximum bending angle.

The end of the cage 34 is counterbored at 54 to a diameter which allows the inner member to pass through on assembly, and the opposite end is counterbored at 55 to a diameter which allows the shaft 32 to move angularly therewithin during the joint articulation (see FIGS. 1 and 2).

A conventional snap ring 56 is let into the shaft 32 to limit movement of the restraining member 48 in a rightward direction as viewed in FIG. 1 and another conventional snap ring 58 is let into the shaft 32 to urge the inner member 10 in the rightward direction into engagement with the cage 34 so that the inner member 10 can limit movement of the cage 34 in a leftward direction as viewed in FIG. 1.

The part-spherical outer surface portion 38 has a center point of curvature at 60 and both of the part-spherical outer and inner surface portions 40 and 44 have a common center point of curvature at 62. The center points 60 and 62 are offset by an equal amount $a$ on opposite sides of the joint center O along the joint axis A (see FIG. 1).

Referring to FIG. 3 there is shown a second embodiment of the present invention. This embodiment is similar to the first embodiment of FIGS. 1 and 2 except that a shaft 32 is provided with a shoulder 66, instead of the snap ring 56 (see FIGS. 1 and 2) and an expandable snap ring 68 let into a groove 69 in the shaft 32 engages a tapered cam surface 70 formed at one end 26 of an inner member 10 (see FIG. 3a), thus urging the inner member 10 in a rightward direction as viewed in FIG. 3. This feature allows that the contacting surfaces between the inner member 10 and cage 34 and those between the cage 34 and restraining member 48 are held in contact with each other in the proper relation, without any play, even if the coacting surfaces wear after a long use, thus extending the life of the joint. Besides this prevents noise and vibration during operation of the joint.

In the constant velocity universal joint as described in the preceding with reference to FIGS. 1 and 2 or FIG. 3, a cylindrical bore 16 of an outer member 12 makes a line-to-line contact with a first part-spherical outer surface portion 38 of a cage 34 so that the outer member 12 centers the cage 34, and a part-spherical inner surface 50 of a restraining member 48 is formed complementarily to and makes a plane-to-plane contact with a second part-spherical outer surface portion 40 of the cage 34 so that the restraining member 48 applies an axial preload to the cage 34. If, with this construction, a part-spherical outer surface portion 20 of an inner member 10 has the center of curvature $O_i$ offset from that $O_c$ of the inner surface portion 44 of the cage 34, as shown in FIG. 4 or 5, on account of insufficient surface finish, then the part-spherical inner surface portion 44 of the cage 34 tends to make a point-to-point contact with a peripheral edge 72 (FIG. 4) or 74 (FIG. 5) of the part-spherical outer surface portion 20 of the inner member 10, and high specific pressure generated allows the edge 72 or 74 to wear at a high rate and high specific heat generated causes seizoure. This problem is attributed to locational relation among the center point of curvature $O_i$ of the part-spherical outer surface portion 20 of the inner member 10, the center point of curvature $O_c$ of the part-spherical inner surface 44 of the cage 34 and a point, indicated at X, at which the outer surface portion 20 makes a contact with the inner surface portion 44.

Figure 8:
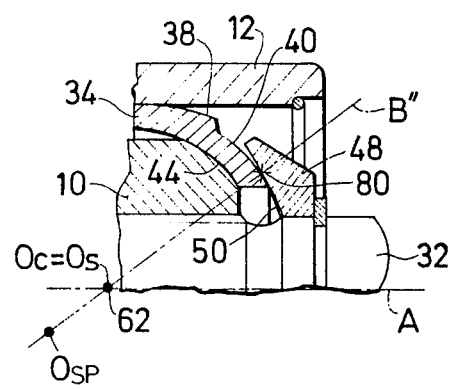
FIG. 8 is a fragmentary sectional view of a fifth embodiment of a constant velocity universal joint according to the present invention.

In order to solve the above mentioned problem one of surface portions 44 and 50 of a cage 34 mates complementarily with the adjacent surface, while the other surface portion of the cage 34 makes a point-to-point contact not with the peripheral edge of but a central portion of the adjacent surface, as shown in FIGS. 6 through 8, in which a cross indicates a contact point at which the two contacting surfaces make a point-to-point contact with each other.

Referring particularly to FIG. 6, the center of curvature Os of a second part-spherical outer surface portion 40 and that of a first part-spherical outer surface portion 38 of a cage 34 are offset by an equal amount on opposite sides of the joint center C (see FIG. 1) along the joint axis A. A part-spherical inner surface 50 of a restraining member 48 is complementary to the second outer surface portion 40 of the cage 34, while the part-spherical inner surface portion 44 of the cage having the center of curvature Oc which is common to the second outer surface portion 40 makes a point-to-point contact with a central portion of a part-spherical outer surface portion 20 of an inner member 10 at a point 76. The center of curvature Os of the second part-spherical outer surface portion 40, the center Oc of the part-spherical inner surface portion 44, the point 76 and the center Oi of the part-spherical outer surface portion 20 are disposed on a line B and the radius of curvature of the outer surface portion 20 of the inner member 10 is shorter than that of the inner surface portion 44 of the cage 44, the former having a greater curvature than the latter, in the joint shown in FIG. 6.

The embodiment shown in FIG. 7 is different from the embodiment of FIG. 6 in that the center of curvature Oc of a part-spherical inner surface portion of a cage 34 and the center Oi of a part-spherical outer surface portion of an inner member 10 are offset on opposite side of the center Os along a line B: interconnecting the center Os and a point 78 at which the two contacting surfaces makes a point-to-point contact.

Referring to FIG. 8, the center of curvature Os of a second part-spherical outer surface portion 40 and that of a first part-spherical outer surface portion 38 of a cage 34 are offset by an equal amount on opposite sides of the joint center O (see FIG. 1) along the joint axis A. A part-spherical outer surface portion 20 of an inner member 10 is complementary to the inner surface portion 44 of the cage 34, while the second outer surface portion 40 of the cage makes a point-to-point contact with a central portion of a part-spherical inner surface 50 of a restraining member 48 at a point 80. The center of curvature Osp of the inner surface 50 of the restraining member 48, the centers Os and Os and the contact point 80 are disposed on a line B::, the center Oc being equal to the center Os. The radius of curvature of the part-spherical inner surface 50 is longer than that of the part-spherical outer surface portion 20.

Figure 9:
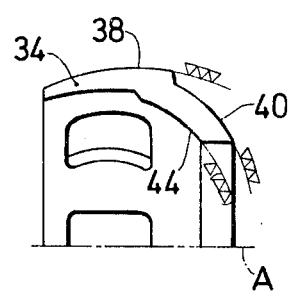
FIG. 9 is a fragmentary sectional view of a cage used in the joint of FIGS. 6, 7 or 8 showing finishing symbols for working surfaces of the cage.

With each of these embodiments shown in FIGS. 6, 7 and 8 centering is performed by mating the cage 34 with the restraining support 48 and with the outer member 12 in the same manner to the centering in the embodiment, shown in FIGS. 1 and 2 or FIG. 3. Because the part-spherical outer surface portion 40 of the inner member 10 or the part-spherical inner surface 50 of the restrainng member 48 is finished and assembled so that the cage makes a point-to-point contact with a central portion of the surface portion 40 of the inner member 10 of the inner surface 50 of the restraining member 48, it suffices for centering without deteriorating the constant velocity characteristics to finish the first and second part-spherical outer surface portions of the cage 34 to a required fine finish (see finish marks shown in FIG. 9).

In the embodiment shown in FIG. 6 or 8 since the part-spherical inner and outer surface portions 44 and 40 of the cage 34 have the common center of curvature Oc or Os at a point 62 which is offset by an equal amount on the opposite side of the joint center O along the joint axis A to the side on which the part-spherical outer surface portion 38 of the cage 34 is disposed, the inner member 10, cage 34 and restraining member 48 tilt about the point 62 on the joint axis A during articulation of the joint without any relative movement along the axis of the shaft 32, and thus the inner member 10 may be affixed to the shaft 32 in an axial fit by a snap ring, in a similar member as shown in FIGS. 1 or 2. The inner member 10 may be affixed to the shaft with a suitable axial urging force by an expandable snap ring in a similar manner as shown in FIG. 3 to compensate for wear on the contacting surfaces of the joint.

In the embodiment shown in FIG. 7, as the center of curvature Oc of the part-spherical inner surface portion 44 of the cage 34 is different in location from that Os of the second part-spherical outer surface portion 40 of the cage, the inner member 10 and restraining member 48 tend to move relative to each other along the axis of the shaft 32 during articulation of the joint. Although this movement will not affect the constant velocity characteristics of the joint, it is preferable that to yield an appropriate pressure between the contacting surfaces during the joint articulation, an expandable snap ring engages a tapered cam surface in the same manner as shown in FIG. 3. If in practice the axial movement is within the allowable limit a snap ring may be used to attach the restraining member and inner member to the shaft in axial fit in the similar manner as shown in FIGS. 1 or 2.

Because at any bending or deflection angle of the joint the inner surface portion 44 of the cage 34 always contacts with the fixed point 76 (in FIG. 6 embodiment) or point 78 (in FIG. 7 embodiment) on the outer surface portion 20 of the inner member 10, it is satisfactory to form a part-spherical surface in the proximity of the point 76 or 78 such as by crowing. Thus it is not necessary, in the FIGS. 6 and 7, that the outer surface portion 20 be completely part-spherical. Since, in FIG. 8 embodiment, the outer surface portion 40 always contacts with the fixed point 80 on the inner surface 50 of the restraining member 48 at any bending or deflection angle of the joint, it is satisfactory to form a part-spherical surface in the proximity of the point 80 and it is not necessary that the inner surface 50 be completely part-spherical.

It will now be appreciated as an advantage of the embodiments shown in FIGS. 6 through 8 that it is not necessary that the inner surface 44 of the restraining member 48 or the outer surface portion 20 of the inner member be completely part-spherical.

Figure 10:
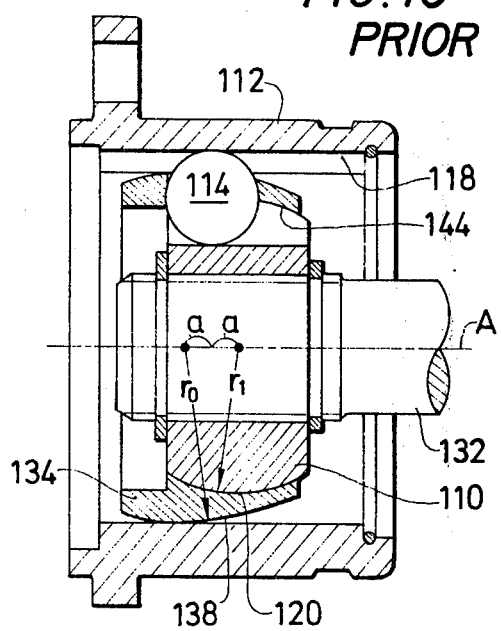
FIG. 10 is an axial sectional view of a constant velocity universal joint according to the prior art.

FIG. 10 shows a constant velocity universal joint constructed according to the prior art before mentioned. This joint comprises an offset cage 134 having a part-spherical outer surface 138 which engages a cylindrical bore 116 of an outer member 112 and a part-spherical inner surface 144 which mates with a complementary part-spherical outer surface 120 of an inner member 110 to center the inner member 110 and hold it in axial fit therein.

Figure 11:
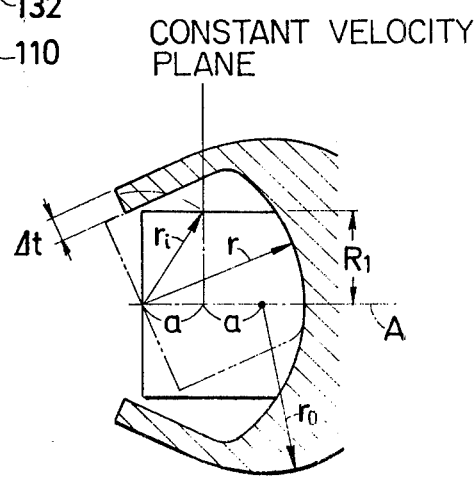
FIG. 11 is a schematic fragmentary sectional view showing a comparison between the cage used in the joint of FIGS. 1 and 2 and a cage used in the point of FIG. 10.

Comparing the cage 34 of the joint of FIG. 1 with the cage 134 of the joint of FIG. 10 under the conditions that the both joints have the same offset amount of a, the same diameter of a cage, the same maximum bending angle and the same plunge amount of the balls into an inner member, the differen ce in thickness between the thinner end of the cage 34 and that of the cage 134 is expressed by the following equation derived from the diagram shown in FIG. 11;

$$\Delta t = r_i - \sqrt{r_i^2 - a^2}$$

where:
- $t$ is the difference in thickness between the thinner end of the cage 34 and that of the cage 134 (see FIG. 11);
- $r_i$ is the radius of curvature the part-spherical outer surface 120 of the inner member 110 (see FIG. 10); and
- $a$ is the offset amount.

From this equation it will be appreciated that according to the present invention the thickness of the thinner end of the cage can be increased without deteriorating the constant velocity characteristics of the joint. In other words according to the present invention the constant velocity characteristics of the joint will be improved by increasing the offset amount because offset amount can be increased without sacrificing the strength of the cage.

Since, in a constant velocity joint according to the present invention, a cage is restrained against axial movement relative to the inner member by a restraining member, an amount of wear on the contacing surfaces has a relatively little influence on the constant velocity characteristics of the joint, as compared to a constant velocity joint shown in FIG. 10. This construction permits a relatively wide deflection angles with little loss in transmitting torque, as compared to the conventional universal joint.

The clearance between the part-spherical contacting surfaces can be adjusted only by replacing a snap ring with another one having a different thickness. It will also be understood that the use of an expandable snap ring in the manner shown in FIGS. 3 and 3a yields an appropriate preload between the contacting surfaces.

The use of an expandable snap ring prevents a relative axial movement of an inner member to a shaft, thus eliminating a noise and vibration due to such axial movement.

The constant velocity joint of the invention hold out substantially the equal rigidity as a unit during any deflection angles of the joint.

What is claimed is:

1. A constant velocity universal joint comprising:
   an outer member with an axial bore therethrough;
   a ball retaining cage within said axial bore and having a first curved outer surface portion which engages said axial bore, a second curved outer surface portion adjacent one end thereof and a curved inner surface portion adjacent said one end, the center of curvature of said first outer surface portion and the center of curvature of at least one of said second outer surface portion of said cage and inner surface portion of said cage being offset by an equal amount on opposite sides of the joint center along the joint axis;
   an inner member within said ball retaining cage and having a curved outer surface portion which engages said inner surface portion of said cage;
   balls mounted in grooves between said outer and inner members and retained by said cage; and
   a restraining member movable with said inner member and having a curved inner surface which engages said second outer surface portion of said cage to assist in preventing relative axial movement between said cage and inner member in at least one direction.

2. A constant velocity universal joint as claimed in claim 1, in which said axial bore is cylindrical.

3. A constant velocity universal joint as claimed in claim 2, in which movement of said cage relative to said inner member in a first direction is prevented by said restraining member and in which movement of said cage relative to said inner member in a direction opposite to said first direction is prevented by engagement of said outer surface portion of said inner member with said inner surface portion of said cage.

4. A constant velocity universal joint as claimed in claim 3, in which both of said second outer surface portion and inner surface portion of said cage have the common center of curvature and said inner surface portion of said restraining member and outer surface portion of said inner member are complementary to said second outer surface portion and inner surface portion of said cage, respectively.

5. A constant velocity universal joint as claimed in claim 4, in which said restraining member has an external generally frustoconical shape which engages said axial bore of said outer member to provide a positive stop against overangling of the joint.

6. A constant velocity universal joint as claimed in claim 3, in which resilient means is provided urging said inner member and restraining member toward each other.

7. A constant velocity universal joint as claimed in claim 3, including a shaft to which said inner member and restraining member are connected and in which said shaft has a shoulder, said inner member has a cam surface and an expandable snap ring is let into said shaft engaging said cam surface of said inner member to urge said inner member in a direction toward said shoulder to urge said restraining member into engagement with said shoulder.

8. A constant velocity universal joint as claimed in claim 1, in which said one of said second outer surface portion and inner surface portion of said cage mates complementarily with the adjacent one of said outer surface portion of said inner member and inner surface of said restraining member and other one of said second outer surface portion and inner surface portion of said cage makes a point-to-point contact with a central portion of the other one of said outer surface portion of said inner member and inner surface portion of said restraining member.

9. A constant velocity universal joint as claimed in claim 1, in which said second outer surface portion of said cage has the center of curvature offset by the equal amount on the opposite side of the joint center to the side in which the center of curvature of said first outer surface portion of said cage is disposed and in which said inner surface portion of said cage makes a point-to-point contact with a central portion of said outer surface portion of said inner member; said inner surface of said restraining member is complementary to said second outer surface portion of said cage and the center of curvature of said second outer surface portion of said cage, the center of curvature of said inner surface portion of said cage, said contact point and the center of curvature of said outer surface portion of said inner member are disposed on a line.

10. A constant velocity universal joint as claimed in claim 9, in which said inner surface portion of said cage has the center of curvature which is common to said second outer surface portion of said cage and the radius of curvature of said outer surface portion of said inner member is shorter than that of said inner surface portion of said cage.

11. A constant velocity universal joint as claimed in claim 9, in which said inner surface portion of said cage has the center of curvature which is offset on one side of the center of curvature of said second outer surface portion of said cage along said line and the radius of curvature of said outer surface portion of said inner member is shorter that that of said inner surface portion of said cage.

12. A constant velocity universal joint as claimed in claim 1, in which said inner surface portion of said cage has the center of curvature offset by the equal amount on the opposite side of the joint center to the side in which the center of curvature of said first outer surface portion of said cage and in which said second outer surface portion of said cage makes a point-to-point contact with a central portion of said inner surface of said restraining member; said outer surface portion of said inner member is complementary to said inner surface portion of said cage and the center of curvature of said second outer surface portion of said cage, the center of curvature of said inner surface portion of said cage, said contact point and the center of curvature of said inner surface of said restraining member are disposed on a line.

13. A constant velocity universal joint as claimed in claim 12, in which said second outer surface portion of said cage has the center of curvature which is common to said inner surface portion of said cage and the radius of curvature of said inner surface of said restraining member is longer than that of said second outer surface portion of said cage.

14. A constant velocity universal joint as claimed in claim 10, in which resilient means is provided urging said inner member and restraining member toward each other.

15. A constant velocity universal joint as claimed in claim 10, said inner member and restraining member are connected and in which said shaft has a shoulder, said inner member has a cam surface and an expandable snap ring is let into said shaft engaging said cam surface of said inner member to urge said restraining member into engagement with said shoulder.

16. A constant velocity universal joint as claimed in claim 11, in which resilient means is provided urging said inner member and restraining member toward each other.

17. A constant velocity universal joint as claimed in claim 11, including a shaft to which said inner member and restraining member are connected and in which said shaft has a shoulder, said inner member has a cam surface and an expandable snap ring is let into said shaft engaging said cam surface of said inner member to urge said inner member in a direction toward said shoulder to urge said restraining means into engagement with said shoulder.

18. A constant velocity universal joint as claimed in claim 13, in which resilient means is provided urging said inner member and restraining member toward each other.

19. A constant velocity universal joint as claimed in claim 13, including a shaft to which said inner member and restraining member are connected and in which said shaft has a shoulder, said inner member has a cam surface and an expandable snap ring is let into said shaft engaging said cam surface of said inner member to urge said inner member in a direction toward said shoulder to urge said restraining member into engagement with said shoulder.

20. A constant velocity universal joint comprising:
an outer member with a cylindrical axial bore therethrough;
a ball retaining cage within said cylindrical axial bore and having a first curved outer surface portion which engages said cylindrical axial bore, a second curved outer surface portion adjacent one end thereof and a curved inner surface portion adjacent said one end, the center of curvature of said first outer surface portion and the center of curvature of at least one of said second outer surface portion of said cage and inner surface portion of said cage being offset by an equal amount on opposite sides of the joint center along the joint axis;
an inner member within said ball retaining cage and having a curved outer surface portion which engages said inner surface portion of said cage;
a shaft with which said inner member is movable;
balls mounted in grooves between said outer and inner members and retained by said cage; and
a restraining member mounted to said shaft to be movable with said inner member and having a curved inner surface which engages said second outer surface portion of said cage to assist in preventing relative axial movement between said cage and inner member in at least one direction.

21. A constant velocity universal joint comprising:
an outer member with a cylindrical axial bore therethrough;
a ball retaining cage within said cylindrical axial bore and having a first curved outer surface portion which engages said cylindrical axial bore, a second curved outer surface portion adjacent one end thereof and a curved inner surface portion adjacent said one end, the center of curvature of said first outer surface portion and the center of curvature of at least one of said second outer surface portion of said cage and inner surface portion of said cage being offset by an equal amount on opposite sides of the joint center along the joint axis;
an inner member within said ball retaining cage and having a curved outer surface portion which engages said inner surface portion of said cage;
a shaft with which said inner member is movable;
balls mounted in grooves between said outer and inner members and retained by said cage; and
a restraining member mounted to said shaft to be movable with said inner member and having a curved inner surface which engages said second outer surface portion of said cage to provide an arrangement whereby movement of said cage relative to said inner member in a first direction is prevented by said restraining member and movement of said cage relative to said inner member in a direction opposite to said first direction is prevented by engagement of said outer surface portion of said inner member with said inner surface portion of said cage, said restraining member having an external generally frustoconical shape which engages said axial bore of said outer member to provide a positive stop against overrangling of the joint.

* * * * *